US008195576B1

(12) United States Patent
Grigg et al.

(10) Patent No.: US 8,195,576 B1
(45) Date of Patent: Jun. 5, 2012

(54) MOBILE TRANSACTION DEVICE SECURITY SYSTEM

(75) Inventors: David M. Grigg, Rock Hill, SC (US); Patrick B. Kelly, Charlotte, NC (US); Alicia C. Jones, Fort Mill, SC (US); Marc B. Keller, Charlotte, NC (US)

(73) Assignee: Bank of America Corporation, Charlotte, NC (US)

(*) Notice: Subject to any disclaimer, the term of this patent is extended or adjusted under 35 U.S.C. 154(b) by 0 days.

(21) Appl. No.: 13/017,823

(22) Filed: Jan. 31, 2011

(51) Int. Cl.
*G06Q 20/00* (2012.01)

(52) U.S. Cl. ............. 705/67; 705/64; 705/44; 705/65; 380/229; 713/155; 713/156; 713/157; 713/158; 713/159; 726/2; 726/5; 726/9; 726/10

(58) Field of Classification Search .............. 705/67
See application file for complete search history.

(56) References Cited

U.S. PATENT DOCUMENTS

| 7,071,113 | B2 | 7/2006 | Kim et al. |
| 2006/0021003 | A1* | 1/2006 | Fisher et al. ............. 726/1 |
| 2006/0123465 | A1* | 6/2006 | Ziegler ............... 726/2 |
| 2010/0051685 | A1 | 3/2010 | Royyuru et al. |
| 2010/0125495 | A1 | 5/2010 | Smith et al. |

FOREIGN PATENT DOCUMENTS

GB 2401015 A * 10/2004

OTHER PUBLICATIONS

Meyer, Roger. Secure Authentication on the Internet (Apr. 4, 2007). Retrieved online Mar. 27, 2012. http://www.sans.org/reading_room/whitepapers/securecode/secure-authentication-internet_2084. 36 pps.*
Grigg, David M., et al., U.S. Appl. No. 13/017,835, filed Jan. 31, 2011.

* cited by examiner

*Primary Examiner* — James A Reagan
(74) *Attorney, Agent, or Firm* — Michael A. Springs; Moore & Van Allen PLLC; Andrew D. Gerschutz

(57) ABSTRACT

Embodiments of the invention include apparatuses, methods, and computer-program products that provide for a unique financial transaction security system. In one embodiment, the financial transaction security system receives a security protocol from a user. The security protocol includes instructions for allowing transactions without authentication and security features for the user if authentication is necessary. The system then determines that the user is conducting a transaction, compares the transaction to the instructions, and determines whether the transaction can occur without authentication. If the user is required to authenticate his identity, the system requests input from the user, compares the input to the security feature, and determines if the user is authenticated. The user is able to customize both the instructions and the security features to provide greater control over financial transaction security.

30 Claims, 9 Drawing Sheets

| | |
|---|---|
| 500 → | |
| | FINANCIAL TRANSACTION SECURITY SYSTEM  502   ☒ |
| 503 — | HOME | USER INFORMATION | ACCOUNTS | PERMITTED TRANSACTIONS | USER AUTHENTICATION | HELP |
| 504 — | CURRENT USER: XXXXX |
| 506 — | ACCOUNT INFORMATION: CHECKING ACCOUNT AND CREDIT ACCOUNTS ACTIVE |
| 508 — | PERMITTED TRANSACTIONS: CUSTOM BASED ON TRANSACTION AMOUNT, MERCHANT, AND CATEGORY |
| 510 — | USER AUTHENTICATION: USERNAME, FACIAL SCANNING, AND VOICE RECOGNITION ACTIVE |
| 512 — | RECENT TRANSACTIONS |

| PAYEE NAME —514 | AMOUNT—516 | DATE—518 | SECURITY ⁄520 |
|---|---|---|---|
| GAS STATION PAY FROM: CREDIT ACCOUNT PREVIOUS BALANCE: $140.00 | $30.00 | 12/01/2010 | AUTOMATIC PAYMENT |
| GROCERY STORE PAY FROM: CHECKING ACCOUNT PREVIOUS BALANCE: $2200 | $120.00 | 12/03/2010 | VOICE SCAN CONFIRMED  522 |
| COFFEE SHOP PAY FROM: CHECKING ACCOUNT PREVIOUS BALANCE: $2080 | $3.00 | 12/04/2010 | AUTOMATIC PAYMENT  524 |

FIG. 5

| FINANCIAL TRANSACTION SECURITY SYSTEM 502 | ☒ |
|---|---|
| HOME | USER INFORMATION | ACCOUNTS | PERMITTED TRANSACTIONS | USER AUTHENTICATION | HELP ||
| CURRENT USER: XXXXX 602 | EDIT 608 | LOG OUT 610 |
| MAILING ADDRESS: ||
| STREET: XXXXXXX ||
| CITY, STATE, ZIP: XXXXXXXXXXXX ||
| PHONE NUMBER: xxx-xxx-xxxx ||
| EMAIL ADDRESS: XXXXXXXXXXXX ||
| ADD A USER: ||
| MAILING ADDRESS: ||
| STREET: _____ ||
| CITY, STATE, ZIP: _____ ||
| PHONE NUMBER: _____ ||
| EMAIL ADDRESS: _____ ||
| AUTHORIZE THIS USER FOR CURRENT ACCOUNTS? ___ YES ___ NO ___ CUSTOMIZE 616 ||

FIG. 6

MOBILE TRANSACTION DEVICE SECURITY SYSTEM

BACKGROUND

People desire convenience and speed when conducting financial transactions but are also concerned about the security of the transactions. Many people conduct transactions at a variety of merchants, such as coffee shops and grocery stores, and would like both convenience and control over their transaction security. Currently, people use debit cards, credit cards, checks, or cash when paying for goods and services. These current forms of payment can be inconvenient to use and lack effective customizable security measures.

When using a debit card or credit card to conduct a financial transaction, the user is often required to enter a personal identification number (PIN) into a point-of-sale (POS) terminal, provide a signature, and/or show a separate form of picture identification (ID). Checks also require separate identification and must be written out, taking up valuable time. Paying for transactions with cash requires that the person carry the cash with them, wait while change is counted out, and risk losing the cash.

There are also efforts to create a "mobile wallet" system where people use their mobile phones or similar mobile devices to engage in financial transactions. In such systems, a person's mobile phone communicates payment information to the POS terminal and the POS terminal then uses this payment information to approve the transaction. These mobile wallet systems also often require the user to take one or more steps to authenticate the user's identity, such as the steps of having to enter a PIN, show a picture ID, provide a signature, etc.

All of these inconveniences can add up to wasted time, effort, and worry for people as they conduct transactions. Furthermore, while some people may think that the security procedures required to use a certain payment device are too onerous and inconvenient, other people may think that the required security procedures are not tough enough for the user to overcome.

Thus, there is a need for improved systems and methods for managing mobile transaction device security in a way that is both convenient and effective for the interested parties.

BRIEF SUMMARY

Embodiments of the present invention address the above needs and/or achieve other advantages by providing an apparatus (e.g., a system, computer program product, and/or other device) and method allowing a user to customize payment procedures and authentication protocols for a mobile payment device, such as a mobile wallet. In some embodiments of the invention the user can provide instructions that control the authentication procedures based on details of a transaction or of the user.

For example, some embodiments of the present invention provide a security management module for managing the security protocols of an electronic wallet in accordance with the preferences of the user of the electronic wallet. As used herein, an "electronic wallet," also referred to herein as a "mobile wallet," refers to an electronic mobile device (e.g., a cell phone, personal data assistant, mp3 player, handheld computer, etc.) that is configured to be used as a payment device (such as a credit or debit card). The electronic wallet stores payment information in its memory that can be used to identify one or more financial accounts. The electronic wallet is further equipped with a wireless communication interface configured to communicate payment information to a payment terminal.

For example, some embodiments of the invention provide a mobile transaction device security system that defines a security protocol for performing a transaction using the mobile payment device, such as a cell phone. The security protocol includes a permission module, which determines whether the user does not need to authenticate his identity to perform the transaction, and an authentication module, which authenticates the identity of the user. If user does not need to authenticate his identity or if the user successfully identifies himself, the financial transaction security system allows the transaction. In some embodiments, allowing the transaction includes transmitting financial account information to a point-of-sale device. The financial account information can be data associated with a checking account, a credit account, a money market account, a rewards account, a prepaid account, or any other type of account used to pay for goods or services.

In some embodiments, the user provides instructions relating to when the user does not need to authenticate his identity to perform a transaction. In some embodiments, the instructions relate to details of the transaction, including the amount of the transaction, the time of the transaction, the identity of the merchant, the category of the expense, and the location of the transaction. For example, the user may not require authentication for transactions of less than five dollars. In some embodiments, the instructions relate to the financial account of the user, such as the balance in the financial account or previous purchases by the user from the account. For example, the user may not require authentication when the balance on the account is greater than two hundred dollars. In further embodiments, the instructions relate to both the transaction and the user. For example, the user can provide instructions in the permission module to not require authentication if the user has made a purchase at the merchant in the previous thirty days. In some embodiments, transactions at specific merchants selected by the user do not require authentication. In other embodiments, merchants are categorized and the user selects categories that do not require authentication. For example, merchants can be categorized as grocery stores, gas stations, coffee shops, restaurants, or user-defined categories. In this example, the user may not require authentication for transactions at gas stations. In some embodiments, merchants are categorized into more than one category. In an embodiment, the user selects default instructions provided by a bank. In a further embodiment, the instructions are customized by the user.

In another embodiment, the user provides security features to the financial transaction security system, which are then available to the mobile device. For example, the user may establish a user name and password or provide a voice recording. In some embodiments, the user provides input to authenticate his identity in order to allow the transaction. In various embodiments, the input is in the form of a user name and/or password, a voice sample, a facial scan, a fingerprint scan, an iris scan, a response to a challenge question, or any other form of input capable of validating the user's identity. The authentication module compares the input with the security feature to authenticate the identity of the user. In some embodiments, the user's financial account information is transmitted to the point-of-sale device at the merchant if the user successfully authenticates his identity.

In an embodiment, the user can manage the financial transaction security system from an application on the mobile device, through software on a personal computer, or via a webpage. In some embodiments, managing the financial transaction security system allows the user to view account settings and recent transactions. Further embodiments, the user is able to edit, update, and/or add additional users and accounts to the financial transaction security system. In still further embodiments, the user is able to provide instructions for allowing a transaction without requiring authentication of the user's identity. In some embodiments, the user provides security features and is able to add, edit, or update saved security features. The financial transaction security system provides numerous opportunities for the user to customize security protocols relating to financial transactions conducted through mobile devices.

In some embodiments, as explained herein the mobile device is a mobile wallet, such as but not limited to a smartphone or PDA that allows a user to enter into transactions using the smartphone or PDA. The mobile device allows the user to make a purchase at a store or over the internet by transmitting through a wired or wireless connection between the mobile device and the systems used to make the transaction. However, it is to be understood that the mobile device can be another type of mobile device, which can be scanned, transmit a wireless signal, be entered manually into a system, etc. in order to make payments using the mobile payment device, as will be described in further detail later.

One embodiment of the invention is an application on a smartphone that stores the user's security protocol, determines that the user is conducting a transaction at a point-of-sale device, and compares the transaction with the instructions provided by the user. If, based on the instructions, the transaction can occur without authentication of the user's identity then the user's financial account information is transmitted to the point-of-sale device. If, however, authentication of the user's identity is required based on the instructions then the user provides input, such as providing a voice sample, and the application compares the input to saved security features. If the application authenticates the user's identity based on the comparison, the user's financial account information is transmitted to the point-of-sale device.

The features, functions, and advantages that have been discussed may be achieved independently in various embodiments of the present invention or may be combined in yet other embodiments, further details of which can be seen with reference to the following description and drawings.

BRIEF DESCRIPTION OF THE SEVERAL VIEWS OF THE DRAWINGS

Figure 1:
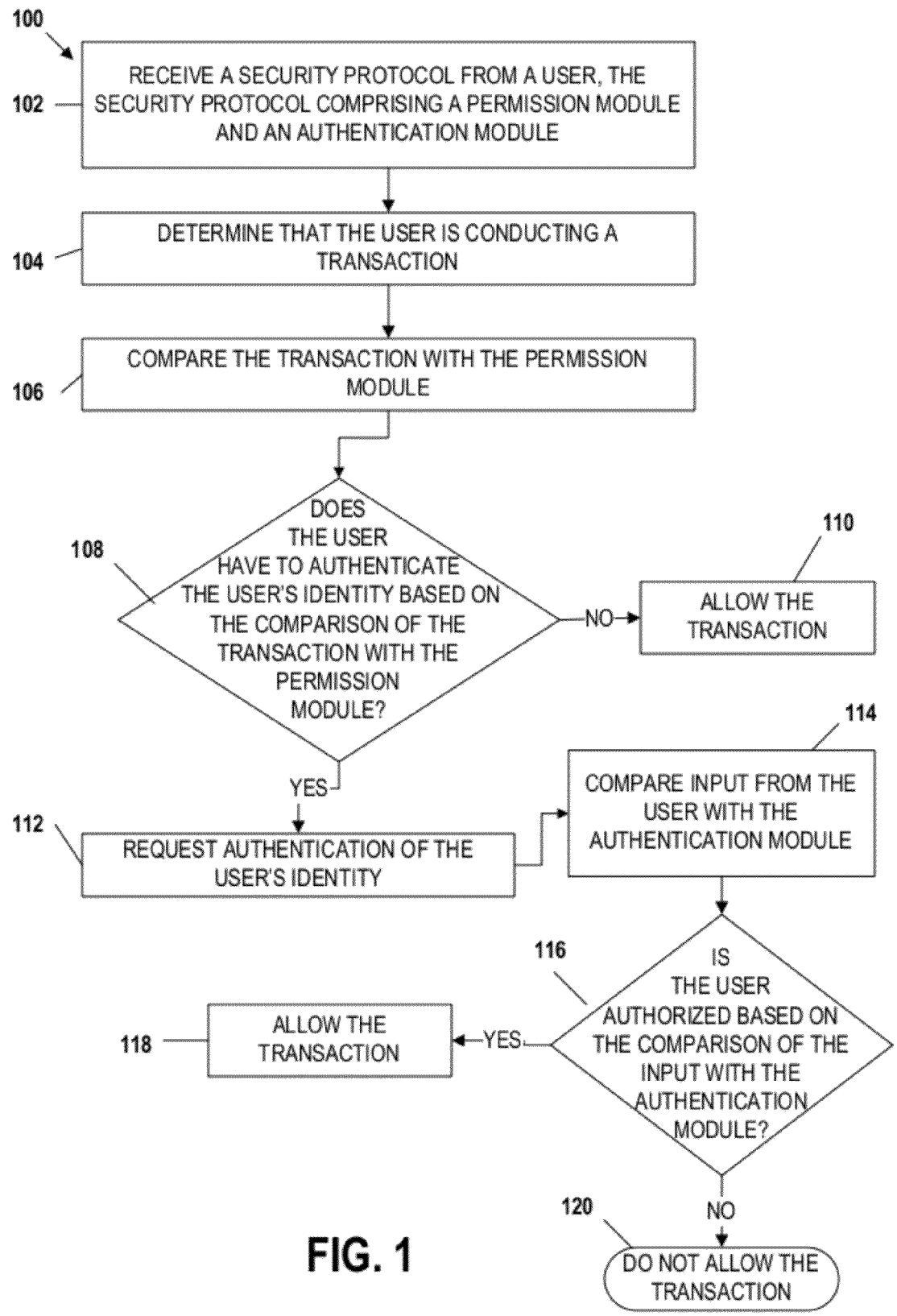
Figure 2:
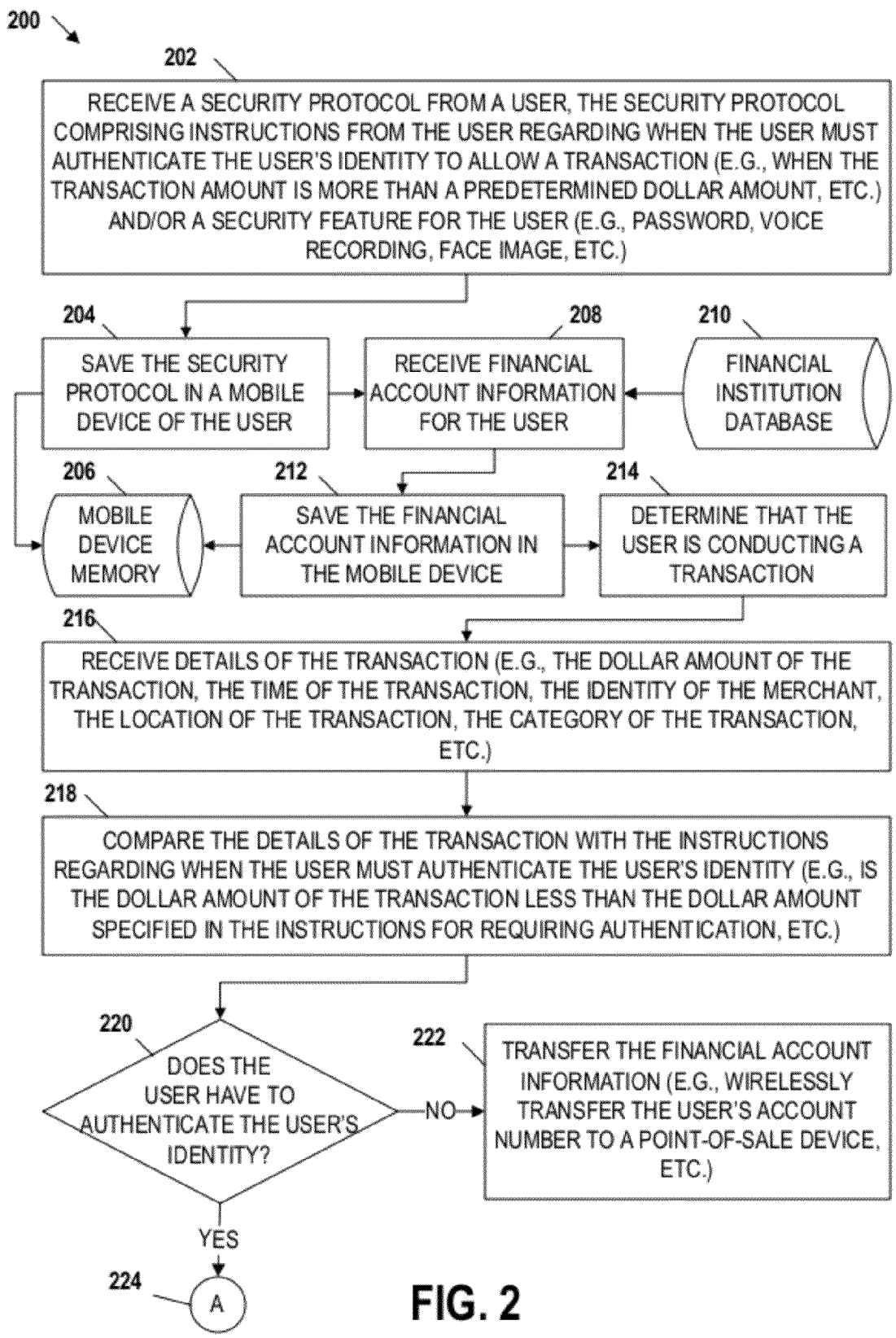
Figure 3:
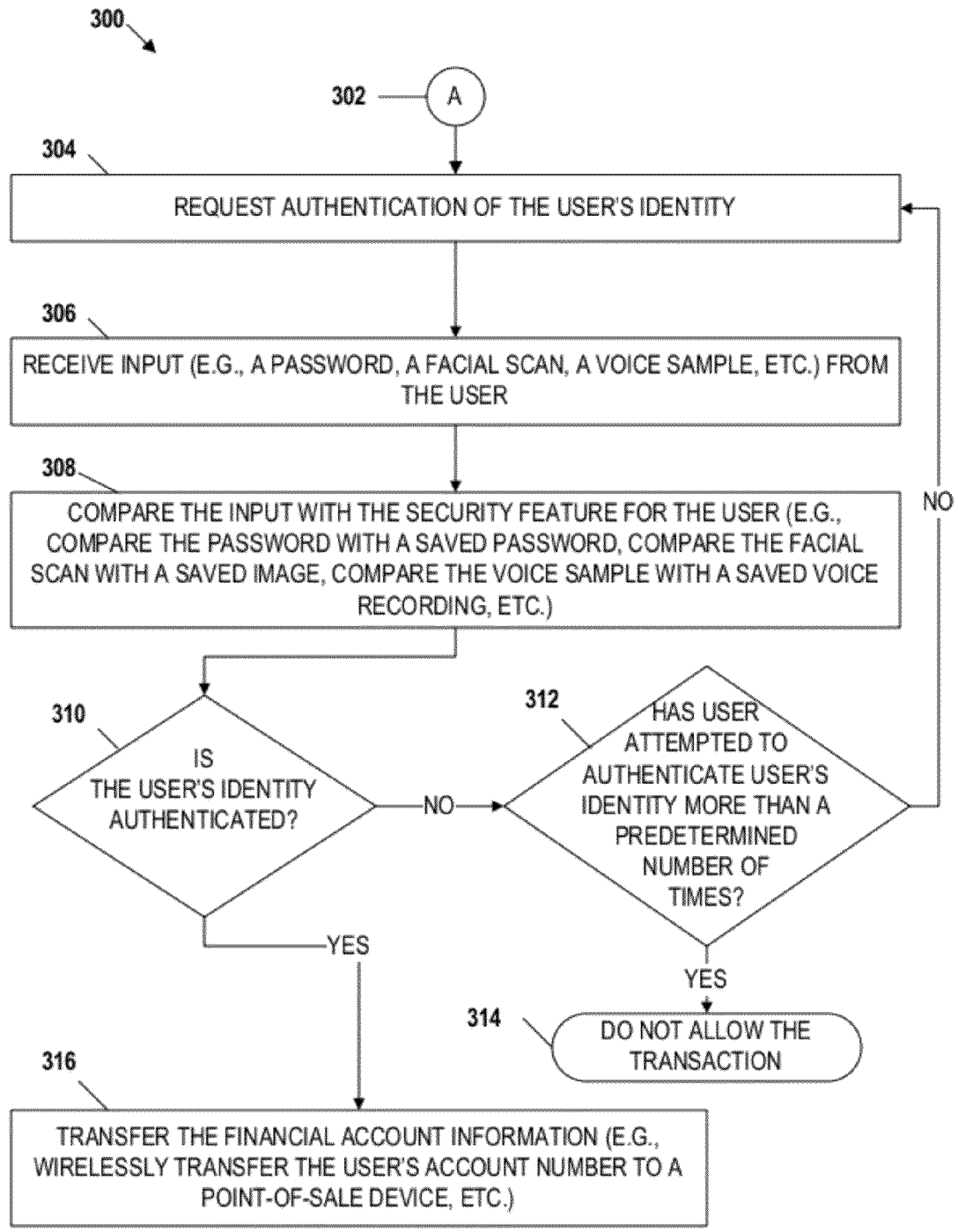
Figure 4:
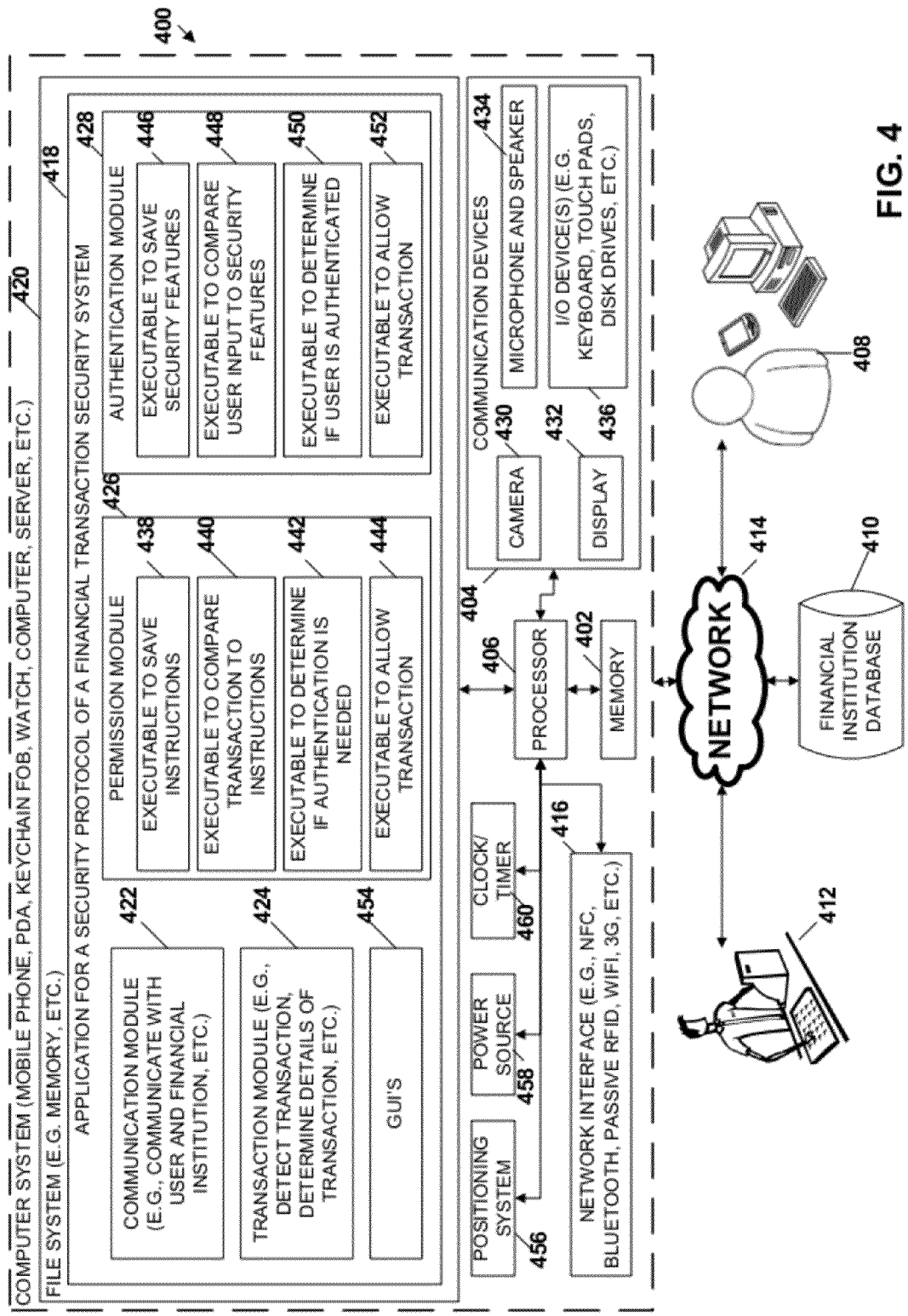
Figure 7:
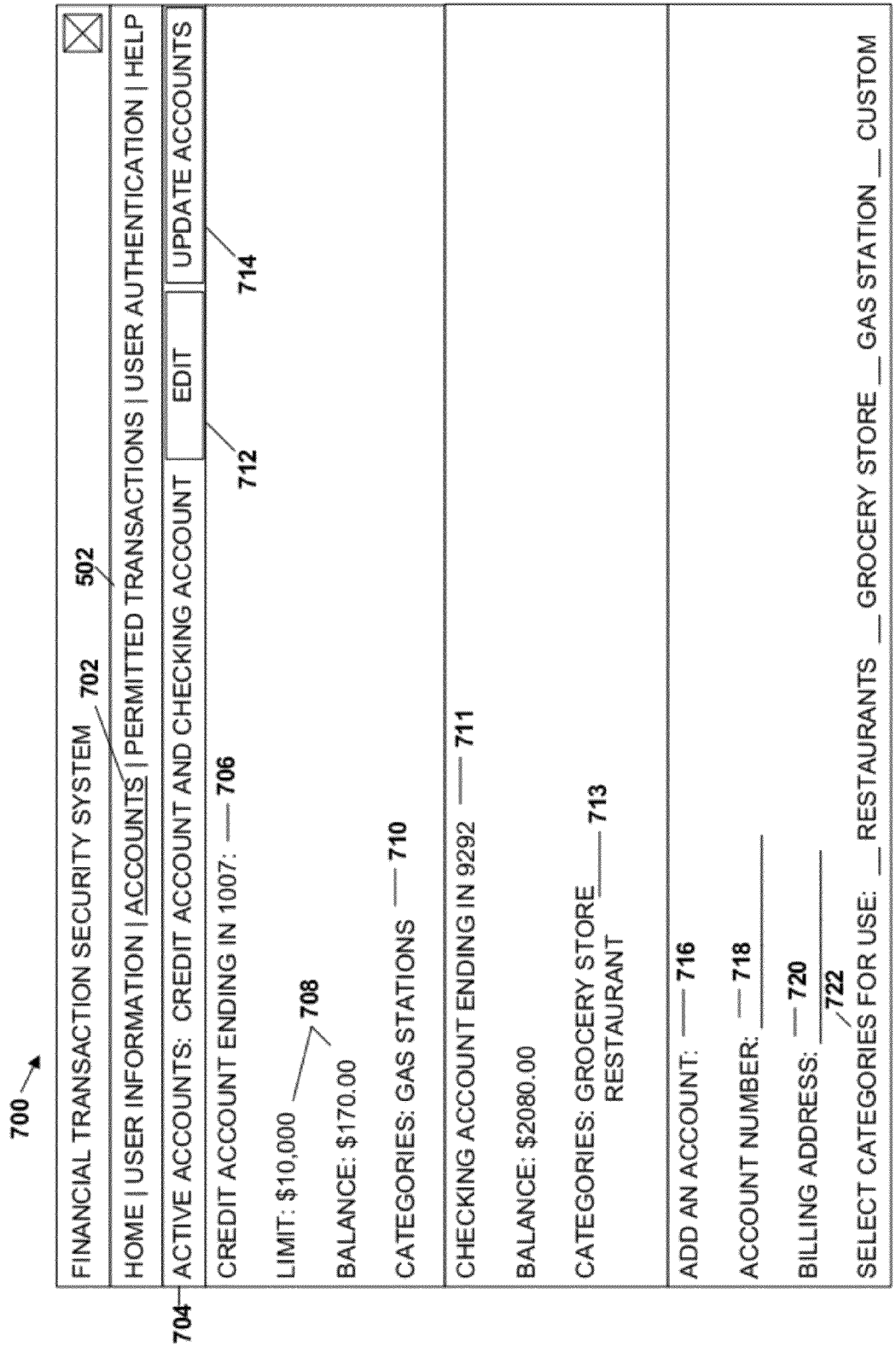
Figure 8:
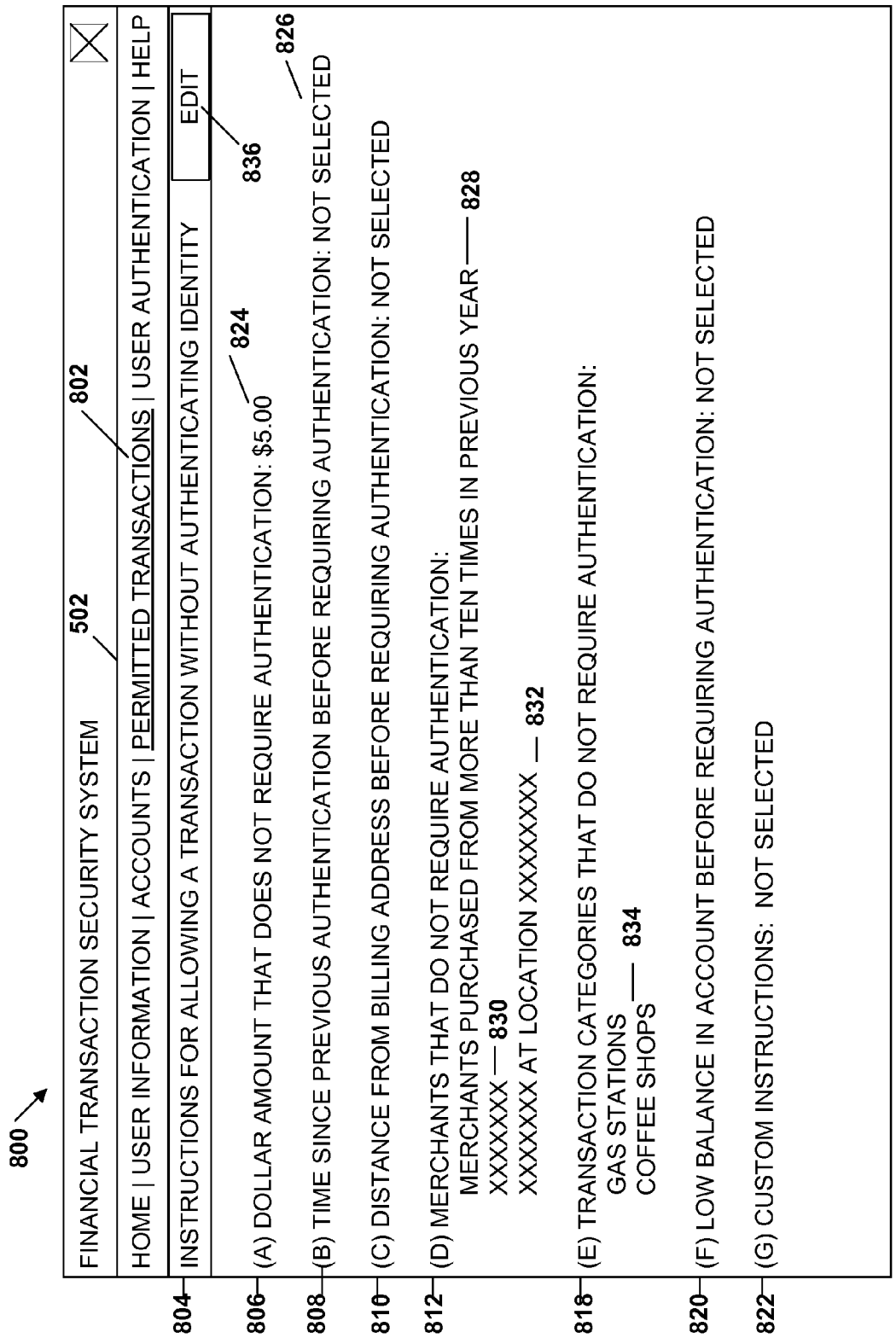
Figure 9:
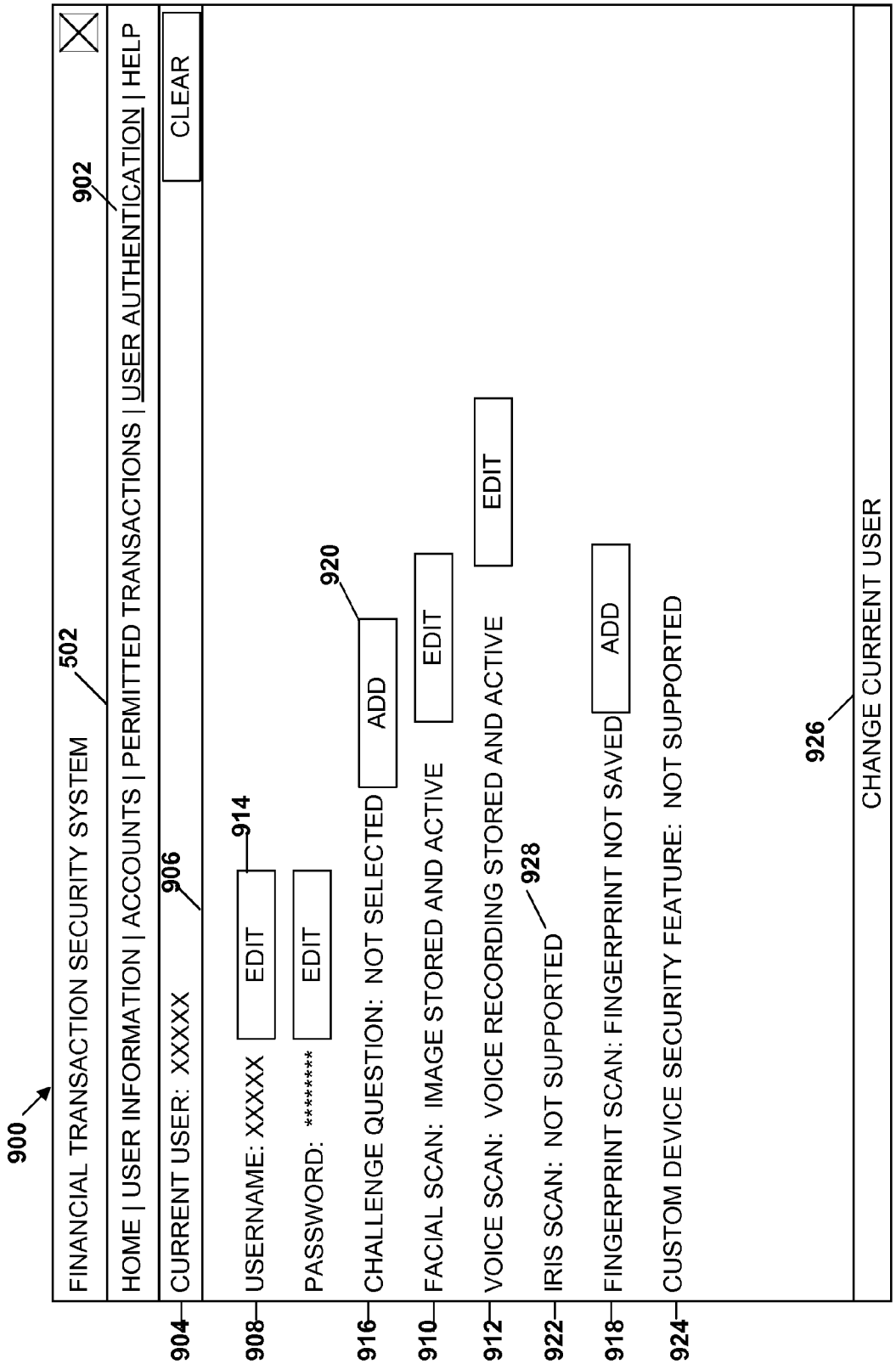

Having thus described embodiments of the invention in general terms, reference will now be made to the accompanying drawings, wherein:

FIG. 1 provides a high level process flow illustrating a financial transaction security system, in accordance with one embodiment of the present invention;

FIG. 2 provides a flow chart of a financial transaction security system wherein the system determines if authentication is not necessary, in accordance with one embodiment of the present invention;

FIG. 3 provides a flow chart of a financial transaction security system wherein the user authenticates the user's identity, in accordance with one embodiment of the present invention;

FIG. 4 provides a block schematic of a financial transaction security system, in accordance with one embodiment of the present invention;

FIG. 5 provides an interface for setting up a financial transaction security system, in accordance with one embodiment of the present invention;

FIG. 6 provides an interface for viewing and editing user information in a financial transaction security system, in accordance with one embodiment of the present invention;

FIG. 7 provides an interface for viewing and editing financial account information in a financial transaction security system, in accordance with one embodiment of the present invention;

FIG. 8 provides an interface for viewing and editing instructions for allowing a transaction without requiring authentication, in accordance with one embodiment of the present invention; and FIG. 9 provides an interface for viewing and editing security features capable of authenticating a user's identity in a financial transaction security system, in accordance with one embodiment of the present invention.

DETAILED DESCRIPTION OF EMBODIMENTS OF THE INVENTION

Embodiments of the present invention now will be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

It should be understood that terms like "bank," "financial institution," and "institution" are used herein in their broadest sense. Institutions, organizations, or even individuals that process financial transactions are widely varied in their organization and structure. Terms like "financial institution" are intended to encompass all such possibilities, including but not limited to banks, finance companies, stock brokerages, credit unions, savings and loans, mortgage companies, insurance companies, and/or the like. Additionally, disclosed embodiments may suggest or illustrate the use of agencies or contractors external to the financial institution to perform some of the calculations, data delivery services, and/or authentication services. These illustrations are examples only, and an institution or business can implement the entire invention on their own computer systems or even a single work station if appropriate databases are present and can be accessed.

FIG. 1 provides a high level process flow illustrating a mobile transaction device security system 100, in accordance with one embodiment of the present invention. The high level process flow will be discussed in greater detail in FIGS. 2 and 3. At a high-level, the financial transaction security system 100 receives a security protocol from a user 102. In some embodiments, the user enters the security protocol into an interface on a mobile device application, a software program, or a webpage. For example, the user may initiate an application on a mobile phone and then enter details relating to the security protocol into the application. In some embodiments, the security protocol is a default level of security provided by a bank. In other embodiments, the security protocol is customizable by the user. The user may change the security protocol in the same manner or in a different manner from which the protocol was initially established.

In some embodiments, the security protocol includes a permission module and an authentication module. As will be discussed in greater detail in FIGS. 2 and 3, the permission module and the authentication module aggregate steps in the method of providing a financial transaction security system. The permission module includes the instructions relating to when the user does not need to authenticate his identity as well as any hardware and/or software used to implement those instructions. The authentication module includes the security features provided by the user as well as any hardware and/or software used to compare an input from the user to those security features. The permission module and the authentication module can be hosted completely on the mobile device, completely on a remote server, or partially on both the mobile device and the remote server.

In an embodiment, the system 100 is configured to determine that the user is conducting a transaction 104. For example, the system may determine that the user is attempting to purchase a product at a merchant using the mobile device. In some embodiments, the system determines that the user is conducting a transaction by detecting a signal from a point-of-sale device. In other embodiments, the system determines that the user is conducting a transaction by receiving an input from the user. For example, the mobile device may have a hotkey, a software application, or a speech recognition program that the user activates in order to indicate that he is conducting a transaction. In an embodiment, the transaction is a purchase of a good or service from a merchant. In other embodiments, however, the transaction is a transfer of funds, a deposit, a loan, etc. The transaction can be to a merchant, another user, a bank, an internet retailer, or an ATM. As is well-known, a wide variety of types of financial transactions are possible. The system 100 provides a customizable set of security protocols for the wide variety of financial transactions.

In some embodiments, the system 100 compares the transaction with the permission module 106. By comparing details of the transaction with the instructions provided by the user on when authentication is not necessary, the system 100 can determine whether the user does not need to authenticate his identity before allowing a transaction 108. For example, the instructions in the permission module may not require authentication for transaction amounts less than five dollars. In some embodiments, if the user does not need to authenticate his identity the transaction is automatically allowed 110. In other embodiments, even if the user does not need to authenticate his identity based on the comparison further input from the user, such as confirmation of the transaction merchant or amount, may be necessary. In an embodiment, if the comparison of the transaction with the permission module indicates that authentication is necessary the system 100 continues on to block 112.

In block 112, the system 100 requests authentication of the user's identity. For example, the system 100 can provide a prompt on a display screen of a mobile device requesting entry of a user name and password. The request can be visual or audible. The request can prepare the mobile device for receiving input from the user. For example, when a request for identification is made the system 100 may activate the microphone and camera on the mobile device in order to capture voice commands or facial scans. The system 100 receives the input from the user in response to the request for authentication of the user's identity.

In some embodiments, the system 100 compares the input from the user with the authentication module 114. The system 100 compares the voice command or the facial scan, for example, with security features saved by the user as part of the authentication module.

Based on the comparison between the input and the authentication module, the system 100 determines whether the user is authorized 116. For example, software associated with the authentication module compares the input with the saved security feature to determine whether the identity of the user is authenticated. If the identity of the user is authenticated, the system 100 allows the transaction 118. If, however, the user is not authorized based on the comparison of the input with the authentication module the system 100 does not allow the transaction 120.

The high level process flow of FIG. 1 illustrates general principles and embodiments of the system and method of providing a financial transaction security system. The examples included above are not limiting and as will be discussed in greater detail later additional steps and or features may be included in the systems and methods.

Turning now to FIG. 2, a flow chart 200 of a financial transaction security system wherein the system determines if authentication is not required is provided, in accordance with one embodiment of the present invention. In block 202, the system receives the security protocol from the user, wherein the security protocol includes instructions from the user regarding when the user does not need to authenticate the user's identity to allow a transaction. In some embodiments, the system also receives at least one security feature from the user, which will be discussed in greater detail in FIG. 3. The system can receive the security protocol from the user in a variety of ways, such as through a software application, through a webpage, in the form of in person instructions at a bank, as written instructions, or in any other form in which the user can provide instructions.

In some embodiments, the instructions relate to the transaction that the user is conducting. For example, the instructions can relate to the transaction amount, the transaction location, the transaction time, the transaction category, or the transaction merchant. In other embodiments, the instructions relate to the user, such as the balance in the user's financial account, the amount recently spent by the user, or the number of transactions recently performed by the user.

In some embodiments, the instructions relate to the transaction amount. For example, in some embodiments the user instructs the system to allow a transaction without authentication when the transaction amount is less than a predetermined amount. The predetermined amount can be an amount provided by the bank, a default amount, or a custom amount. In some embodiments, multiple amounts are provided. For example, the bank can provide default instructions relating to multiple amounts. In one embodiment, the default instructions require tiered levels of security such as no authentication for less than $20, a user name and password for amounts between $20 and $100, and a biometric scan for amounts greater than $100. The users may also determine that different transaction amounts require different types of authentication or lack thereof. For example, a couple may decide that for transaction amounts greater than $200 authentication by both individuals is required. The couple may also decide that for transaction amounts less than $10 no authentication is required and that for amounts between $10 and $200 authentication by at least one individual is required. In other embodiments, the user instructs the system to allow a transaction without authentication for amounts greater than a predetermined level, within a predetermined range, at an exact amount, or any other relationship between the transaction amount and permission to conduct transactions.

In some embodiments, the instructions relate to the transaction location. For example, the user may provide instructions that authentication is not required for transactions performed within twenty miles of the user's home. In some embodiments, the system determines the user's location when the user is conducting a transaction by means of a positioning system, such as a GPS or software that determines the user's location based on proximity to cell towers. In an embodiment, the user provides instructions relating to distance from a predetermined location, such as the user's residence or billing address. For example, a user may not want to authenticate transactions within five miles of a work address so that transactions can be performed quickly. In another embodiment, the user provides instructions relating to political boundaries, such as city, county, and state. When the system determines the user's location, that location can be cross-referenced to maps and/or coordinates. In this manner, the political entities in which the user is located can be determined. For example, the GPS on a user's cell phone can determine the user's latitude and longitude. The system can compare that latitude and longitude to maps and determine which city, county, and state the user is currently located within. The user may desire to allow transactions without authentication for convenience or security.

In some embodiments, the instructions relate to the transaction time. For example, the user's mobile device may include a clock or timer which determines the time at which the user is attempting to conduct the transaction. In an embodiment, the user provides instructions that allow transactions without authentication during predetermined time windows. For example, the user may allow transactions without authentication between 8 AM and 5 PM so that the user can quickly and easily conduct transactions during work hours. In another embodiment, the user provides instructions that do not require authentication if the user has authenticated his identity within a predetermined time period. For example, the user can provide instructions that allow transactions without authentication if the user has authenticated his identity within the previous two hours. When the user attempts to conduct a transaction, the system determines the time and determines whether the previous authentication is within the past hour. If the user has authenticated his identity within the previous two hours, the system does not require authentication. Again, by allowing customization of when the user does not need to authenticate his identity the system provides convenience along with customized security for financial transactions.

In some embodiments, the user provides instructions that allow transactions without authentication when the transaction is within a specific category. For example, the user may instruct the system to allow transactions at gas stations without authentication. Other examples of transaction categories include grocery stores, coffee shops, restaurants, home goods stores, clothing stores, or other known or custom categories of stores. Certain stores may be included in more than one category. For example, some stores include both groceries and a pharmacy and may be included in the grocery store category and the drug store category. In some embodiments, the categories are defined by the bank. In other embodiments, the categories are defined by, edited, or modified by the user. In some embodiments, the user determines that authentication is not needed in general categories. In other embodiments, the user sets different levels of security required in different categories. For example, gas stations may require no authentication so that transactions are quick and easy but restaurants may require a higher level of security.

In a still further embodiment, the user provides instructions to allow transactions without authentication based on the transaction merchant. For example, the user may allow transactions without authentication at predetermined specific merchants. The users can select the merchants from a list provided by the bank, the user can input specific merchants, the user can select merchants from previous transactions, the user can provide an indication during a transaction that transactions at the merchant do not need authentication in the future, or the user can select merchants in any other way in which they are able to provide details regarding specific merchants. In another embodiment, the user provides instructions to allow transactions without authentication at merchants where the user has previously performed a transaction. For example, the user may allow transactions without authentication at merchants that the user has purchased from within the past month, or at merchants the user has purchased from more than ten times in the past year, or at merchants where the user has at any time performed a transaction. In some embodiments the user can select a chain store merchant and allow transactions without authentication at any one of the chain stores. In other embodiments, the user selects a specific chain store and does not expand the permission to include all other stores within the same chain.

In some embodiments, the instructions relate to the user at the time of the transaction. For example, the instructions can relate to the user's financial account information. In an embodiment, the instructions allow transactions without authentication so long as there is a minimum balance in the user's financial account. If the transaction would bring the account below a predetermined amount, the user will have to authenticate his identity in order to allow the transaction. In another embodiment, the instructions allow transaction without authentication if the user has not performed a predetermined number of transactions recently. For example, the instructions may allow transactions without authentication if the user has performed fewer than twenty transactions in the current month. Both the number of transactions and the time period are customizable by the user. In a still further embodiment, the instructions allow transactions without authentication until the user spends a certain amount in the predetermined period of time. For example, the user may be able to conduct transactions without authentication if the user has not spent above $400 in a month; all transactions after reaching $400 in purchases may require authentication. By adjusting the security levels based on user information, the user is able to customize the security levels, assist in budgeting, and gain greater control over expenses.

In a still further embodiment, the instructions are combined in a variety of ways. For example, the user can provide instructions that combine the number of recent transactions with the transaction categories. For example, a user may provide instructions allowing transactions without authentication for purchases at restaurants until the user has made more than six purchases at restaurants in the current month. Users can, for example, customize their instructions based on combinations of the transaction amount, transaction location, transaction time, transaction category, transaction merchant, account balance, number of transactions, and/or total expenses. The instructions provided by the user allow each user to customize a security protocol for conducting financial transactions with ease, security, and speed.

Turning now to block 204, in some embodiments the security protocol is saved in a mobile device of the user. For example, the security protocol can be saved in mobile device memory 206. The memory can be a removable card, such as an SD-card, or an embedded hard drive. Other types of memory are also possible, as is known. In an embodiment, the mobile device is a cell phone or Personal Digital Assistant (PDA). In another embodiment, the mobile device is specifically designed for conducting financial transactions with the financial transaction security system, such as a keychain dongle. The form factor of the security system can vary widely if the method and functions associated with the system can be configured to operate on the form factor. For example, the financial transaction security system could be incorporated into a watch or other electronic device. In other embodiments, the security protocol is saved on a server and accessed via a network when the user attempts to conduct a transaction. In still further embodiments, parts of the security protocol are saved in the mobile device and other parts of the security protocol are saved on a server accessed via the network. In another embodiment, the mobile device and/or mobile device memory is encrypted so that the instructions and security features are protected if the mobile device is lost or stolen.

In block 208, the system receives financial account information for the user. In some embodiments, the system only receives the account number from a financial institution database 210. In other embodiments, however, the system receives the account number and other related information, such as previous transactions, balances, addresses and contact information associated with the account, other accounts associated with the user, and other account information available from the financial institution database 210. The system can receive the financial account information wirelessly or through a wired connection. In some embodiments, the system updates the account information, such as on a regular schedule, intermittently, when the system is able to connect to the financial institution, or when prompted to do so by the user. The system also saves the financial account information for access by the mobile device 212. In some embodiments, the financial account information is saved in the mobile device memory 206. As with the security protocol, the financial account information may be encrypted and/or hosted in whole or in part on a server and accessed when needed.

In block 214, the system determines that the user is conducting a transaction. In some embodiments, the system determines that the user is conducting a transaction by detecting or receiving a signal from a point-of-sale device. The system can activate in response to receiving the signal from the point-of-sale device. In other embodiments, the system determines that the user is conducting a transaction by receiving an input from the user. For example, the mobile device may have a hotkey, a software application, or a speech recognition program that the user activates in order to indicate that he is conducting a transaction.

In some embodiments of the invention, as depicted in block 216, the system receives details of the transaction. In an embodiment, the system receives details of the transaction from the merchant, such as when the merchant provides a signal that the user is conducting a transaction. In other embodiments, the system receives details of the transaction from the user, such as input from the user into the mobile device. In a still further embodiment, the system receives details of the transaction from the user's financial institution, alone or in combination with either of the merchant or the user. In an exemplary embodiment, the system receives details of the transaction wirelessly from a point-of-sale device.

Details of the transaction that may be received by the system include the amount of the transaction, the time of the transaction, the identity of the merchant, the location of the transaction, the category of the transaction, or any other features associated with a transaction that can be provided by the user, the mobile device, the merchant, or the financial institution. For example, the system can receive details from the merchant about the identity of the merchant and from the user's financial institution regarding the number of times the user has frequented that merchant in the past year. In another example the system receives details regarding the amount of the transaction from the merchant and the category of the transaction from the user. The system may prompt the user to select or input a category for the expense. In yet another example the system receives the time of the transaction from a clock or timer associated with the mobile device. Similarly, the system can receive the location of the transaction from a GPS unit, through triangulation based on cell phone signals, from the merchant, from a financial institution, or from the user.

In block 218, in some embodiments the system compares the details of the transaction with the instructions regarding when the user must authenticate his identity. The system provides software capable of comparing the details of the transaction with the instructions to determine when the user must authenticate his identity. In an embodiment, the system compares the details with the instructions using software embedded on the user's mobile device. In another embodiment, the system compares the details with the instructions using software on a server that is remotely accessed. An example of comparing the details to the instructions is comparing the amount of the transaction with the instructions allowing transactions without authentication when the transaction amount is below a predetermined level. Another example is when the identity of the merchant is compared to instructions allowing transactions without authentication at predetermined merchants. A further example is when the details of the transaction include the location of the transaction and the location is compared to instructions that allow the user to perform transactions without authentication within a specified city. A still further example is when the time of the transaction is determined based on the mobile device clock and the system compares the length of time since the previous user authentication to instructions allowing transactions without authentication before a predetermined period of time has elapsed, for example authentication may not be required if the user has authenticated his identity within the previous four hours. As discussed previously, a multitude of instructions relating to transactions and/or the user are possible. Similarly, a multitude of details regarding transactions can be received by the system from the user, the mobile device, the financial institution, and/or the merchant. By combining and comparing the details with the instructions, the system provides a customizable security system for financial transactions.

In block 220, the system determines whether the user must authenticate the user's identity based on the comparison of the details of the transaction with the instructions. In some embodiments, if the user does not have to authenticate his identity based on the comparison, the system transfers the user's financial account information to allow the transaction 222. In an embodiment, the system wirelessly transfers the user's financial account information to a point-of-sale device. In this embodiment, the point-of-sale device can then complete the transaction through standard methods of completing transactions, such as with credit or debit cards. If the user does need to authenticate his identity based on the comparison the system moves from the permission module to the authentication module, as indicated at 224 and depicted in FIG. 3.

FIG. 3 depicts a flow chart of a financial transaction security system wherein the user authenticates the user's identity 300, in accordance with one embodiment of the present invention. The flowchart corresponds to the authentication module of the financial transaction security system. If the system determines that the user must authenticate his identity 302, the system will request authentication of the user's identity 304.

Requesting authentication of the user's identity 304 can occur in a variety of ways. In an embodiment, the user's mobile device prompts the user to authenticate his identity. The request can be visual or audible. In an embodiment, the request allows a user to authenticate his identity in any manner. For example the user may be able to authenticate his identity using a username and password, a facial scan, or a voice scan. In this embodiment, the system would request authentication using any of these methods. In another embodiment, the system requests authentication in a specific manner. For example, the system may specifically request a facial scan. Determination of the method for authentication can be based on the transaction, instructions from the financial institution, instructions from the user, instructions from the merchant, or randomly. For example, the user's bank may require authentication based on one of the biometric scans for transaction amounts greater than $1000. As discussed in a previously described example, the user may set different tiers of authentication depending on the transaction amount. The user may allow a transaction without authentication for transaction amounts less than $5, require authentication by a username and password for transaction amounts between $5 and $100, and require a biometric scan for transactions greater than $100.

In block 306, the system receives input from the user in an embodiment. The input may be, for example, a username or password, a facial scan, a voice sample, an iris scan, a fingerprint scan, a response to a challenge question, etc. In an embodiment, the system receives the input from a communication device associated with the user's mobile device. For example, the system may receive the input from the keyboard, a touch screen, a microphone, and/or a camera associated with the user's mobile device.

In some embodiments, the input provided by the user is in the form of a hotkey, application, voice command, or movement of the mobile device. In these embodiments, the input automatically indicates that the transaction is authorized without needing to authenticate the user's identity further. U.S. patent application Ser. No. 13/017,835 to Grigg et al., entitled "Transaction Authorization System for a Mobile Commerce Device," and filed concurrently herewith, describes such a device, system, and method in greater detail and is hereby incorporated by reference in its entirety.

The system receives security features for use with the authentication module, in some embodiments. For example, the security feature may be a username and password provided by the user and stored in the mobile device memory or on a server. Other examples of security features include facial images for use with facial recognition software, voice recordings for use with voice recognition software, iris images for use with iris scanning software, a bank of challenge questions and answers, a scanned fingerprint for use with fingerprint scanning software, or other features that are capable of authenticating the user's identity in conjunction with input from the user.

In an embodiment, the system compares the input with the security feature for the user 308. For example, the system can compare the username and password entered by the user with a username and password previously stored by the user in the system to determine if the system is able to authenticate the user's identity. Similarly, the system could compare the facial scan with the saved image of the user's face, the voice sample with the saved voice recording, the response to the challenge question with the bank of challenge questions and answers previously saved by the user, the iris scan with the previously stored image of the user's iris, the fingerprint scan with the previously stored image of the user's fingerprint, or any other security feature capable of authenticating the user's identity.

In some embodiments, the system determines whether the user's identity is authenticated based on the comparison 310. For example, if the input username and password match the saved username and password then the user's identity is authenticated. If, however, the user's identity is not authenticated based on the comparison of the input with the security feature the system can determine whether the user should have another opportunity to authenticate his identity 312. For example, the user may have incorrectly entered the password and desire another opportunity to enter it correctly. The user and/or the financial institution can set a predetermined number of times that the user is able to attempt authentication of his identity, such as three times. If the user exceeds that predetermined number of times then the system can end and not allow the transaction 314. This provides greater security in case the mobile device is lost or stolen. If the user has not exceeded the predetermined number of times then the system can again request authentication of the user's identity, as depicted in block 304.

In another embodiment, the system requests authentication of the user's identity using a different method than previously attempted by the user. For example, if the user unsuccessfully attempted to authenticate his identity using a facial scan the first time, the system may next prompt the user to authenticate his identity using a voice scan.

If the user has successfully authenticated his identity, in some embodiments the system transfers the user's financial account information 316. In an embodiment, the system wirelessly transfers the user's financial account information to the point-of-sale device so that the merchant may complete the transaction through standard means. In other embodiments, the system wirelessly transfers the user's financial account information to another user, an ATM, or to an online retailer to complete a transaction.

FIG. 4 is a schematic block diagram of a financial transaction security system 400, in accordance with an embodiment of the invention. In some embodiments, the system 400 includes a computer system such as a mobile phone, PDA, keychain fobs, watch, computer, server, electronic device, etc. In an exemplary embodiment, the financial transaction security system is a mobile phone including a memory device 402, a communication device 404, and a processing device 406. In some embodiments, the system interacts with the user 408, the financial institution 410, and the merchant 412 over a network 414. The system may additionally include a network interface device 416, such as a Near Field Communication (NFC) device, a Bluetooth device, a Radio Frequency Identification (RFID) device, or other device capable of interacting with the network 414.

The network 414 may be a global area network (GAN), such as the Internet, a wide area network (WAN), a local area network (LAN), a wifi network, a 3G network or any other type of network or combination of networks. The network 414 may provide for wireline, wireless, or a combination of wireline and wireless communication between devices on the network.

As used herein, the term "processing device" generally includes circuitry used for implementing the communication and/or logic functions of a particular system. For example, a processing device 406 may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 406 may include functionality to operate one or more software programs based on computer-readable instructions thereof, which may be stored in the memory device 402.

The processing device 406 is operatively coupled to the communication device 404 and the memory device 402. The processing device 406 uses the communication device 404 to communicate with the user 408. Additionally the processing device uses the network interface 416 to communicate with the network 414 and other devices on the network 414, such as, but not limited to, the financial institution database 410 and the merchant 412.

As further illustrated in FIG. 4, the financial transaction security system includes computer-readable instructions 420 stored in a file system, which in one embodiment includes the computer-readable instructions 420 of a security protocol application 418.

In the embodiment illustrated in FIG. 4 and described throughout much of this specification, the security protocol application 418 allows for communication between a communication module 422, a transaction module 424, a permission module 426, and an authentication module 428 to send, receive, and store information related to the financial transaction security system, determine details relating to a transaction, determine whether user authentication is not necessary, and authenticate the user's identity.

Specifically, the communication module 422 facilitates communication between the security system and the user 408. In some embodiments, the communication module 422 controls the communication devices associated with the system. For example, the communication module 422 can control a camera 430, a display 432, a microphone and/or speaker 434, and I/O devices such as keyboards, touchpads, etc. 436. In some embodiments, the communication module 422 also controls the network interface 416 for facilitating communication with the user's financial institution 410, other users, and the merchant 412.

In some embodiments, the transaction module 424 determines that the user is conducting a transaction and determines the details of the transaction. In an embodiment, the transaction module 424 interacts with the communication module 422 to receive a signal from a point-of-sale device at a merchant 412 to determine that the user is conducting the transaction, establishes a connection with the point-of-sale device, receives details of the transaction, and completes the transaction.

In some embodiments, the permission module 426 determines whether a user must authenticate his identity before allowing a transaction. In some embodiments, the permission module includes at least one of an executable to save instructions 438, an executable to compare the transaction to the instructions 440, an executable to determine if authentication is needed 442, and an executable to allow the transaction 444. The executables can be subroutines available to the security protocol application and called up when input is received or output is needed.

In some embodiments, the executable to save instructions 438 receives instructions from the user 408 and saves them to the memory device 402. The executable to save instructions 438 interacts with the communication module 422 and the communication devices 404 to receive the instructions regarding when the user does not need to authenticate his identity. In an embodiment, the executable to save instructions 438 provides default instructions that are selected by the user. In another embodiment, the executable to save instructions guides 438 the user through a process of providing instructions.

In some embodiments, the executable to compare the transaction to the instructions 440 compares details of the transaction with the instructions. For example, the executable 440 may compare the transaction amount received from the transaction module 424 with the instructions regarding the amount below which authentication is not needed. The executable 440 interacts with the transaction module 424 and the memory device 402 to receive the data used to make the comparison.

In some embodiments, the executable to determine if authentication is needed 442 evaluates the output of the comparison provided by executable 440 and determines whether the instructions indicate that the user need not authenticate his identity. If the executable to determine if authentication is needed 442 determines that authentication is not needed, in some embodiments the executable to allow transactions 444 transfers the user's financial account information. The executable to allow transactions 444 interacts with the transaction module 424 and the network interface 416 to transfer the user's financial account information to a point-of-sale device at the merchant 412, for example.

In some embodiments, the authentication module 428 includes at least one of an executable to save security features 446, an executable to compare user input to security features 448, an executable to determine if the user is authenticated 450, and an executable to allow the transaction 452.

The executable to save security features 446 receives security features from the user 408 and saves them in the memory device 402, in some embodiments. For example, the user can provide a username and password as security features, which the executable to save security features 446 would receive through the communication module 422. The executable to save security features 446 can prompt the user to update and/or enter new security features after a period of time or a number of failures to authenticate the user. For example, the voice recording saved may be of poor quality and after five times of being unable to authenticate the user using the voice recording, the executable to save security features 446 could delete the saved recording and prompt the user to record a new one.

In some embodiments, the executable to compare the user input to the security features 448 evaluates input from the user 408 received through communication devices 404 to saved security features stored in the memory device 402. For example, the executable to compare the input to the security features 448 may include voice recognition software to compare the voice sample to a saved voice recording. In another example, the executable 448 includes software to compare an answer to a challenge question to a saved answer previously provided by the user. The executable 448 interacts with the communication module 422 and the memory device 402 to receive the data used to make the comparison, in some embodiments.

In an embodiment, the executable to determine if the user is authenticated 450 evaluates the results of the comparison from the executable to compare the user input to the security features 448. In some embodiments, the executable 450 determines that the user is authenticated if the comparison indicates the input is identical to the security feature. In another embodiment, the input must merely be similar to the security feature, such as with a facial scan, voice scan, iris scan, and fingerprint scan. The system is configured to consider the limitations of the communication devices 404 and determine that the user is authenticated if the input is close enough to the security feature to allow the transaction. In some embodiments, the user is able to select the level of similarity that must be present before the system determines that the user's identity is authenticated. In other embodiments, the financial institution determines the level of similarity that must be present before the user's identity is authenticated. For example, the financial institution may determine that a fingerprint scan must have 90% similarity with a saved fingerprint before authenticating the user's identity.

In some embodiments, the executable to allow transactions 452 transfers the user's financial account information if the user's identity is authenticated. In an embodiment, the executable to allow transactions 452 wirelessly transfers the user's financial information to a point-of-sale device at a merchant 412 when the user's identity is authenticated. In some embodiments, the executable to allow transactions 452 interacts with the transaction module 424 and the network interface 416 to securely transfer the user's account information.

The security protocol application 418 also includes Graphical User Interfaces (GUI's) 454, in some embodiments. The GUI's 454 assist in communication between the user 408 and the system. Multiple GUI's 454 can be available for the communication module 422, the transaction module 424, the permission module 426, and the authentication module 428. GUI's 454 can also be provided that assist the user in utilizing the communication devices 404, or any other feature of the financial transaction security system 400.

In some embodiments, the system also includes a positioning system 456, a power source 458, and a clock or timer 460. In an embodiment, the positioning system 456 is a Global Positioning System (GPS). In another embodiment, the positioning system is an accelerometer. In some embodiments, the power source 458 is a battery, such as a battery coupled to the mobile device. In other embodiments, the power source 458 is a receiver for receiving power from a remote source. For example, the power source may be receiver that receives power from a point-of-sale device through Near Field Communication devices. In some embodiments, the system operates without onboard power if the power source 458 is configured to receive power from the point-of-sale device.

It is understood that the servers, systems, and devices described herein illustrate one embodiment of the invention. It is further understood that one or more of the servers, systems, and devices can be combined in other embodiments and still function in the same or similar way as the embodiments described herein.

FIG. 5 illustrates an interface 500 for setting up a financial transaction security system, in accordance with one embodiment of the present invention. The interface 500 can include a variety of tabs 502 for viewing and editing information related to the financial transaction security system. One of the tabs can be a home tab 503 that provides general information related to the security system. For example, the home tab 503 can include information related to the current user 504, the account information 506, the permitted transactions 508, the types of user authentication available to the user 510, and recent transactions 512 that have occurred through the security system.

In an embodiment, information relating to the current user 504 is available because more than one user may share a mobile device and desire to log in to the security system so that personal instructions and security features are available. In an embodiment (not illustrated), more than one user is listed at 504 and instructions, accounts, and security features for each user may be concurrently available through the mobile device. In some embodiments, the account information 506 is provided on a home page so that the user quickly and easily knows which accounts can be drawn from during a transaction. In the example illustrated in FIG. 5, the user's checking and credit accounts are active. In some embodiments, general descriptions of the permitted transactions 508 are provided on the home page. For example, the general descriptions may include descriptions of the instructions for allowing transactions without authentication. In the example depicted in FIG. 5, the instructions permit transactions without authentication based on the transaction amount, the transaction merchant, and the transaction category. This allows the user to quickly know that a transaction will not be allowed without authentication based on geographic location. In a still further embodiment, the home page includes information related to user authentication 510. For example, FIG. 5 depicts that the security system includes security features related to a username, a facial scan, and a voice scan. This information allows the user to quickly determine whether providing a facial scan could authenticate the user's identity if needed.

FIG. 5 also includes an interface describing recent transactions 512, in accordance with an embodiment of the invention. In some embodiments, the interface describing recent transaction 512 includes the payee name 514, the transaction amount 516, the date of the transaction 518, and the type of security applied to the transaction 520. For example, the security applied to the transaction 520 can be automatic payment based on a comparison of the details of the transaction with the instructions 522 or it can be based on a comparison of the user input with the security features 524. In general, the home tab 503 provides overview information so that a user is kept up-to-date regarding recent transactions and the status of the financial transaction security system.

Turning now to FIG. 6, an interface for viewing and editing user information in a financial transaction security system is presented 600, in accordance with one embodiment of the present invention. The interface includes the tabs 502 that allow the user to switch between multiple interfaces. In an embodiment, one tab provides content relating to user information 602. In some embodiments, the user information interface 600 includes content related to the current user 602, the current user's contact information 606, and the ability to add a user 612. In an embodiment, the identity of the current user 604 is provided so that the person viewing the financial transaction security system on the mobile device will know whether his identity is active in the system. For example, if more than one person uses a cell phone each person may want to have a different security protocol on the cell phone and hence would need to change users as the phone changed hands. An edit button 608 allows the users to be changed for the financial transaction security system, in some embodiments. Contact information 606 may also be provided for the user. In an embodiment, this contact information is used for both information purposes and in conjunction with instructions relating to when authentication is not required. For example, the mailing address can be used in conjunction with instructions relating to the user's location. In some embodiments, if the user is located within ten miles of the user's mailing address when the user is conducting a transaction, the user does not need to authenticate his identity. The contact information may also be updated and/or added to by the edit button 608, for example by adding a business address. The current user 604 is also able to log out 610 of the financial transaction security system.

In some embodiments, the user information tab 602 includes the ability to add a user 612 to the financial transaction security system. The additional user can be added to the current security protocol 614 or can create a customized security protocol 616. User information can be provided for the additional user 612. In some embodiments, the ability to add an additional user allows a single mobile device to serve as a transaction device for multiple people. Further, the transaction device can be personalized for each user.

In FIG. 7, an interface for viewing and editing financial account information in a financial transaction security system is provided 700, in accordance with one embodiment of the present invention. In some embodiments, the interface 700 includes tabs 502 for switching between different content-providing interfaces. In an embodiment, an Accounts tab 702 provides content related to the user's accounts, including display and editing of the financial account information. For example, in some embodiments the Accounts tab 702 includes information related to the active accounts 704 in the financial transaction security system. For each account, the type of account and at least a portion of the account number are displayed 706. Information 708 pertaining to each account, such as the credit limit and account balance is provided. In some embodiments, additional information pertaining to the instructions for allowing transaction without authentication is also included. For example, in an embodiment different accounts are linked to different transaction categories. In the example disclosed in FIG. 7, the credit account 706 is associated with transactions occurring at gas stations 710 while the checking account 711 is associated with transaction occurring at grocery stores and restaurants 713. By linking accounts to transaction categories, users are able to direct transactions through specific accounts based on categories. In other embodiments, the user is able to link specific accounts to transaction amounts, transaction location, transaction merchants, or other details of the transaction or user account information. This allows greater control over transactions and budgeting from multiple accounts for the user.

In an embodiment, the Accounts tab 702 includes the ability to add accounts 716 to the financial transaction security system. In some embodiments, the accounts include checking accounts, savings accounts, money market accounts, credit accounts, rewards accounts, or other types of financial accounts. The user can add the account number 718, the billing address 720 or other account information (e.g., the credit limit), and indicate the transaction categories 722 for which the account is active. In an embodiment (not shown), the user is able to also indicate other characteristics of the transaction or user account information for which the account is active. For example, the user can indicate that a new account should be used for all transactions less than $5. In another example, the user can indicate that a new account should be used until the balance in the account is below $100 or within $500 of the credit limit.

In some embodiments, as depicted in FIG. 8 the system provides an interface for viewing and editing instructions for allowing a transaction without requiring authentication 800, in accordance with one embodiment of the present invention. In an embodiment, the tabs 502 include a Permitted Transactions tab 802 that provides content and editing related to the instructions for allowing a transaction without authenticating the user's identity 804. In some embodiments, the most common types of instructions are displayed on the interface so that the user can easily and quickly view the instructions that control when a user can conduct a transaction without authentication. For example, the interface can display the transaction amount below which the user does not need to authenticate his identity 806, the time since the previous authentication before authentication is necessary 808, the distance from the billing address before requiring authentication 810, merchants that do not require authentication 812, transaction categories that do not require authentication 818, low balances before requiring authentication 820, or custom instructions 822. In an embodiment, the specific instruction is displayed 824, for example the transaction amount below which authentication is not required is $5 in FIG. 8. In another embodiment, the interface indicates that instructions are not selected or provided 826, for example for time since previous authentication and distance from billing address in FIG. 8. In a still further embodiment, instructions related to merchant identity may be subdivided into instructions that relate to merchants the user has frequented recently 828, chain merchants 830 such that the user can conduct transactions at any of the chain merchant stores, or specific merchants 832 defined by a location. In another embodiment, the transaction categories for which authentication is not needed 834 are also provided for ease of reference by the user. The interface can provide a level of content regarding the instructions so that the user can easily review and edit 836 the instructions if needed.

Turning now to FIG. 9, an interface for viewing and editing security features capable of authenticating a user's identity in a financial transaction security system is provided 900, in accordance with one embodiment of the present invention. In some embodiments, the interface 900 includes tabs 502, such as a User Authentication tab 902. The User Authentication tab 902 may include the identity of the current user 904 and the types of security features 906 that are uploaded to the financial transaction security system for that user. In the example displayed in FIG. 9, the user's username and password 908, the user's facial scan 910, and the user's voice scan 912 are available to the financial transaction security system. In an embodiment, the user is able to edit 914 the stored features using the mobile device. The interface may also indicate which security features are not available to the user because they have not been provided to the system yet. For example, in FIG. 9 challenge questions 916 and fingerprint scans 918 have not been saved to the financial transaction security system yet. In an embodiment, the interface allows the user to add 920 these security features using the mobile device. In a still further embodiment, the interface also indicates security features which the financial transaction security system is capable of evaluating but which the mobile device does not support 928. For example, in FIG. 9 the mobile device does not support iris scanning 922 and has no custom device security features 924 available to the user. For example, the camera on a mobile phone may be unable to scan the user's iris with sufficient accuracy to be able to authenticate the user's identity, while another mobile phone may have a camera with high enough resolution to perform the scan (in which case the iris scan would be supported). In a still further embodiment, the interface allows the user to change 926 the current user 904 so that custom security features are saved for multiple users associated with the mobile device.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." For example, various embodiments may take the form of web-implemented computer software. Furthermore, embodiments of the present invention may take the form of a computer program product on a computer-readable medium having computer-executable program code embodied in the medium.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatuses and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

As used herein, a processor/computer, which may include one or more processors/computers, may be "configured to" perform a stated function in a variety of ways, including, for example, by having one or more general-purpose circuits perform the stated function by executing one or more computer-executable program code portions embodied in a computer-readable medium, and/or by having one or more application-specific circuits perform the stated function.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments may be configured without departing from the scope and spirit of the invention. Therefore, it is to be understood that, within the scope of the appended claims, the invention may be practiced other than as specifically described herein.

What is claimed is:

1. A mobile transaction device security system comprising:
   a memory device;
   a communication device; and
   a processing device coupled to the memory device, wherein the processing device is configured to:
   receive a security protocol from a user, the security protocol comprising a permission module and an authentication module, wherein the permission module comprises instructions on when the user must authenticate an identity of the user to perform a transaction, wherein the instructions are provided by the user and stored in a database;
   determine that the user is conducting the transaction;
   compare at least one characteristic of the transaction with the instructions provided by the user; and
   determine a process for authenticating the user by:
   determining if the user must authenticate the user's identity based on the comparison of the transaction with the instructions provided by the user,
   allowing the transaction if the user is not required to authenticate the user's identity based on the comparison, and
   requiring authentication of the user through the authentication module if the comparison of the transaction to the instructions provided by the user indicates that the transaction cannot proceed without authentication, wherein requiring authentication comprises requesting authentication of the user's identity, receiving input from the user, comparing the input to the authentication module, and allowing the transaction if the user is authorized to perform the transaction based on the comparison of the input with the authentication module.

2. The system of claim 1, wherein the authentication module comprises at least one security feature.

3. The system of claim 2, wherein the at least one security feature is customizable by the user.

4. The system of claim 2, wherein the security feature consists of at least one of a username, a password, a challenge question, a voice recognition test, a facial recognition test, a fingerprint identification test, and an iris scan.

5. The system of claim 1, wherein the communication device consists of at least one of a keyboard, a scanner, a touchpad, a camera, a speaker, and a microphone.

6. The system of claim 1, wherein the characteristic of the transaction consists of at least one of the dollar amount of the transaction, the identity of the merchant, the category of the expense, the time of the transaction, and the location of the transaction.

7. A computer-implemented method of providing financial transaction security, the method comprising:
   receiving a security protocol from a user, the security protocol comprising a permission module and an authentication module, wherein the permission module comprises instructions on when the user must authenticate an identity of the user to perform a transaction, wherein the instructions are provided by the user and stored in a database;
   determining that the user is conducting the transaction;
   comparing at least one characteristic of the transaction with the instructions provided by the user;
   determining if the user must authenticate the user's identity based on the comparison of the transaction with the instructions provided by the user;
   allowing the transaction if the user does not need to authenticate the user's identity based on the comparison; and
   requiring authentication of the user through the authentication module if the comparison of the transaction to the instructions provided by the user indicates that the transaction cannot proceed without authentication, wherein requiring authentication comprises:
      requesting authentication of the user's identity,
      receiving input from the user,
      comparing the input to the authentication module, and
      allowing the transaction if the user is authorized to perform the transaction based on the comparison of the input with the authentication module.

8. The method of claim 7, wherein receiving the security protocol from the user comprises receiving security features for authenticating the user's identity.

9. The method of claim 7, wherein determining that the user is conducting a transaction comprises receiving a signal from a point-of-sale device indicating that the user is attempting to conduct a transaction.

10. The method of claim 7, wherein comparing the transaction with the instructions provided by the user comprises comparing at least one of a transaction amount, a transaction time, a transaction location, a transaction merchant, and a transaction category with predetermined instructions in the permission module.

11. The method of claim 7, wherein allowing the transaction comprises transferring account information of the user to a point-of-sale device.

12. The method of claim 11, wherein the transferring the user's account information to the point-of-sale device comprises wirelessly transferring the account information.

13. The method of claim 7, wherein requesting authentication of the user's identity comprises receiving input of at least one of a username, a password, an answer to a challenge question, a voice recognition scan, a facial scan, a fingerprint scan, and an iris scan.

14. The method of claim 13, wherein comparing the input from the user with the authentication module comprises comparing the input from the user with a security feature.

15. The method of claim 14, wherein the security feature is stored in memory associated with a mobile device.

16. The method of claim 15, wherein the memory is capable of receiving power from a point-of-sale device.

17. A computer program product for providing a financial transaction security product, the computer program product comprising:
   a non-transitory computer-readable medium comprising:
      an executable portion for causing a computer to receive a security protocol from a user, the security protocol comprising a permission module and an authentication module, wherein the permission module comprises instructions on when the user must authenticate an identity of the user to perform a transaction, wherein the instructions are provided by the user and stored in a database;
      an executable portion for causing a computer to determine that the user is conducting the transaction;
      an executable portion for causing a computer to compare at least one characteristic of the transaction with the instructions provided by the user;
      an executable portion for causing a computer to determine if the user must authenticate the user's identity based on the comparison of the transaction with the instructions provided by the user;
      an executable portion for causing a computer to allow the transaction if the user does not need to authenticate the user's identity based on the comparison; and
      an executable portion for requiring authentication of the user through the authentication module if the comparison of the transaction to the instructions provided by the user indicates that the transaction cannot proceed without authentication, wherein requiring authentication comprises:
         requesting authentication of the user's identity,
         receiving input from the user,
         comparing the input to the authentication module, and
         allowing the transaction if the user is authorized to perform the transaction based on the comparison of the input with the authentication module.

18. The computer program product of claim 17, further comprising an executable portion for causing a computer to determine a location of the user when the user is conducting the transaction.

19. The computer program product of claim 17, further comprising memory coupled to the non-transitory computer readable medium.

20. The computer program product of claim 19, wherein the memory stores at least one of financial account information for the user, instructions associated with the permission module for the user, and security features associated with the authentication module for the user.

21. The computer program product of claim 20, wherein the user's financial account information consists of information associated with at least one of a checking account, a savings account, a money market account, a credit account, an investment account, and a rewards points account.

22. The computer program product of claim 17, wherein the permission module requires the user to authenticate the user's identity if a transaction amount is over a predetermined dollar amount.

23. The computer program product of claim 17, wherein the permission module requires the user to authenticate the user's identity if the transaction is occurring at a non-approved merchant.

24. The computer program product of claim 23, wherein the non-approved merchant is a merchant that the user has not purchased from previously.

25. The computer program product of claim 17, wherein the permission module requires the user to authenticate the user's identity if the user has not authenticated the identity within a predetermined time period.

26. The computer program product of claim 17, wherein the permission module requires the user to authenticate the user's identity if the user is outside of predetermined geographical areas.

27. The computer program product of claim 17, wherein the permission module requires the user to authenticate the user's identity if a transaction amount would lower a balance in the user's account below a predetermined level.

28. The computer program product of claim 17, wherein the permission module requires the user to authenticate the user's identity if the user has already conducted a predetermined number of transactions within a predetermined time period.

29. The computer program product of claim 17, wherein allowing the transaction comprises determining an account from which a payment for the transaction is made.

30. The computer program product of claim 29, wherein determining the account comprises comparing the transaction to instructions received from the user.

\* \* \* \* \*